Patented Sept. 2, 1952

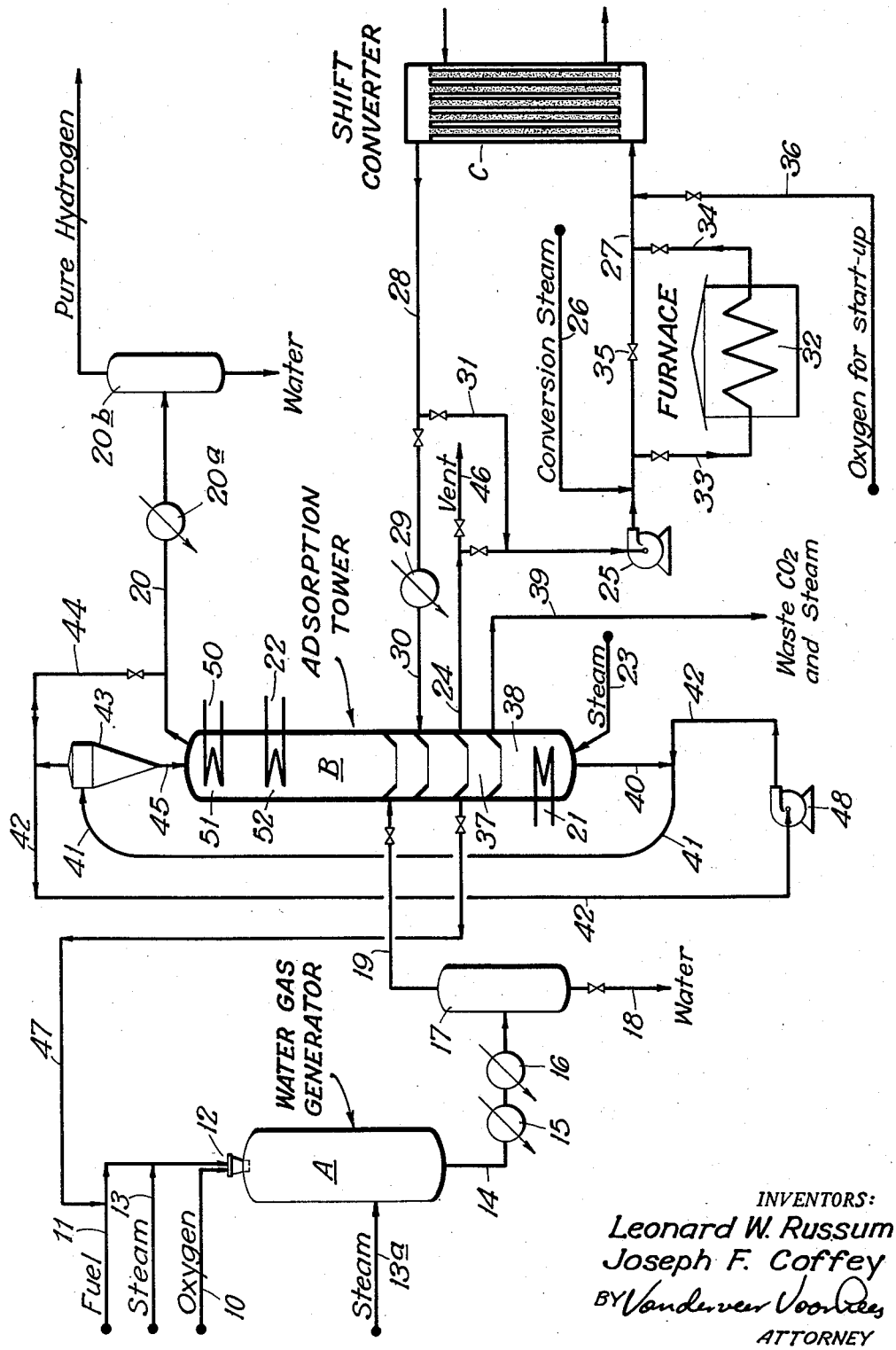

2,609,274

UNITED STATES PATENT OFFICE 2,609,274

HYDROGEN PROCESS

Leonard W. Russum, Whiting, and Joseph F. Coffey, Valparaiso, Ind., assignors to Standard Oil Company, Chicago, Ill., a corporation of Indiana Application December 31, 1949, Serial No. 136,262

6 Claims. (Cl. 23—214)

This invention relates to a process of making hydrogen and more particularly it relates to a process of making substantially pure hydrogen from carbon monoxide or from water gas. The invention is illustrated by a drawing which shows diagrammatically an apparatus for carrying out the process.

In the manufacture of hydrogen, it has long been a difficult problem to produce substantially pure hydrogen on a commercial scale. Many hydrogenation processes, such as hydrogenation of oils and fats, require hydrogen which is relatively free from contamination with other gases. Carbon monoxide is especially detrimental to certain catalytic hydrogenation processes where it exerts a poisoning effect on the catalyst. Accordingly, for many such processes it has been the practice to use electrolytic hydrogen obtained from the electrolysis of water at considerable expense for electric power.

In the manufacture of hydrogen from carbon monoxide or water gas, it has heretofore been the practice to conduct the water gas in admixture with steam over a "shift" catalyst, the following reaction occurring:

$$CO + H_2O = CO_2 + H_2$$

This reaction is moderately exothermic and accordingly it is necessary to provide some degree of cooling. The reaction temperature ordinarily employed is about 750° to 850° F.

When equimolar amounts of CO and H₂O are employed at a temperature of 800° F., the reaction proceeds only partially in the desired direction so that, at equilibrium, only 75 per cent of CO has been converted to CO₂, with the result that much unconverted CO remains with the hydrogen product. Ordinarily it is the practice to increase greatly the amount of water or steam employed in order to shift the equilibrium further in the desired direction, and it is not uncommon to employ ten volumes of steam per volume of CO in the reaction mixture, this amount corresponding to about ten times that theoretically required. This substantially increases the cost of the operation, not only because of the increased steam requirement but because of the increased size of the apparatus required for handling the larger volumes of gas, increase in cooling water requirements, etc.

One object of our process is to reduce the amount of steam employed in the shift conversion of CO to hydrogen and CO₂. Another object of our process is to produce a substantially pure grade of hydrogen free of CO. Still another object of our process is to eliminate expensive purification steps including CO₂ absorption by aqueous solutions. The process will be more fully understood by referring to the drawing in which A is a water gas generator, B is a continuous adsorption tower, and C is a shift converter.

Water gas for our process can be supplied from various sources such as the usual water gas generator in which a bed of coke is alternately blasted with air and steam. Water gas can also be prepared from coke by the action of oxygen and steam at water gas reaction temperatures, e. g. 1800 to 2400° F. This operation can be conducted in the well-known Winkler fluidized bed generator or the powdered coke, oxygen and steam can be interacted in a suitable insulated reaction chamber to produce a mixture of CO and hydrogen continuously.

The drawing describes a water gas generator in which oxygen introduced by line 10 reacts with a suitable hydrocarbon gas, usually methane or natural gas, introduced by line 11 into burner 12. Steam, when required, is simultaneously introduced by line 13 and the gases, intimately mixed in burner 12, complete their reaction in the reaction chamber A, which is a pressure chamber lined internally with suitable refractories. Additional steam may be added by line 13a if desired. At a final reaction temperature of 2400° F., about 80 per cent of the methane is converted to carbon monoxide and hydrogen according to the following reactions:

$$CH_4 + O_2 \rightarrow CO + H_2O + H_2$$
$$CO + H_2O \rightarrow CO_2 + H_2$$
$$CH_4 + H_2O \rightarrow CO + 3H_2$$

Instead of methane we may also use other gaseous fuels such as ethane, propane and butane.

It is usually desirable to operate the water gas generator under substantial pressure, e. g. 50 to 600 p. s. i., a suitable pressure being about 300 p. s. i. Pressures of this order do not interfere significantly with the water gas reaction and when handling large volumes of gases the use of pressure has the advantage of reducing the size of the equipment for a given volume of gas thruput. If desired, the pressure may be increased by compression before the gas is charged to adsorption tower B.

The hot gaseous reaction products pass from generator A by line 14 to heat exchanger 15 in which part of the heat of the gases is usefully absorbed, for example, by heating the gases charged to the generator A. Thus it is desirable to preheat the oxygen to about 800 to 1200° F., and where methane is employed as a fuel this can be preheated to 1200° to 1400° F. From exchanger 15, gases are passed thru cooler 16 thence into water separator 17 where any excess water is collected and discharged by line 18. The gases can be additionally dried, e. g. with silica gel, calcium chloride, etc., if desired. The gases then pass by line 19 to adsorption tower B where they are brought into contact at a temperature in the range of about 75–250° F. With a downwardly flowing stream or moving bed of adsorptive charcoal or other suitable adsorbent. In some cases bauxite or silica gel can be used for the purpose, and mixtures of these and other adsorbents can be employed.

The adsorbent flowing downward in tower B adsorbs from the gases, water vapor, $CO_2$, and CO; the hydrogen, which is adsorbed to only a small extent, flows up through the cooling section 52 and through the heating section 51 countercurrent to the downward flowing carbon, and is withdrawn from the tower by line 20 leading to cooler 20a and separator 20b.

The adsorbent charcoal carrying CO, $CO_2$ and $H_2O$ passes downward thru the tower and is heated at or near the bottom by heating coil 21. The temperature in the cooling section 52 at the upper part of the tower B is kept relatively low, e. g. 50 to 125° F., by the use of cooling coils such as those shown at 22. Instead of supplying heat to the charcoal by heating coil 21 located within the tower, the adsorbent may be withdrawn and heated externally in a suitable heat exchanger from which the desorbed gases are withdrawn and returned to the tower. It is desirable to heat the adsorbent to a temperature sufficient to desorb substantially all the adsorbed gases, particularly any residual CO. A suitable temperature is about 500° to 700° F. Desorption of the gases from the charcoal is also greatly facilitated by the introduction of steam by line 23 and superheated steam may be used for this purpose to increase the heat input at the bottom of the adsorber.

The desorbed gases flowing upward thru the tower countercurrent to the downflowing stream of charcoal establish a temperature gradient from the bottom to the midpoint of the tower where the feed gas is introduced. If desired, additional heating coils can be interspersed in the tower to maintain the proper temperature gradient therein. Ordinarily this is not necessary and all the heat necessary for desorption can be introduced at the bottom.

As the charcoal flows downward thru the tower below the feed point, the gas first desorbed from it is hydrogen; in the next lower zone 37, at temperatures in the range of about 95 to 300° F., the principal gas desorbed is CO, part or all of which is withdrawn by line 24 leading to circulating pump 25. Steam is injected into the stream of CO by line 26 and the mixture then passes by line 27 to converter C. In case relatively pure CO is available as a feed gas it can be charged directly to the shift converter instead of to the adsorption tower. Here the CO in contact with the shift catalyst is converted to $CO_2$ and an equivalent amount of hydrogen is produced. Hydrogen and unconverted CO together with the $CO_2$ pass from the converter by line 28 thru cooler 29 thence by line 30 to the adsorption tower B. Temperature in the shift converter can be controlled by recycling hot gases from line 28 thru by-pass line 31 leading back to pump 25.

In starting up the shift converter, i. e. bringing it up to temperature, gases may be recycled thru furnace 32 employing lines 33 and 34 and block valve 35 for this purpose. However, the cost of the furnace installation can be avoided by burning a portion of the CO in line 27 by injecting oxygen thereinto, line 36 being shown for this purpose. After the converter is up to temperature, the supply of oxygen is cut off.

The temperature of the shift converter C may also be controlled by means of a cooling fluid surrounding the catalyst tubes therein, circulation of the cooling fluid being effected to hold the temperature at any desired point. Following are typical shift catalysts for use in the reaction tubes of converter C:

| | | |
|---|---|---|
| $Fe_2O_3$ | 74.2 | 89.8 |
| $Cr_2O_3$ | 10.0 | 7.5 |
| MgO | 0.2 | |
| $H_2O$ (combined) | 14.0 | 1.3 |
| Inerts | 1.6 | 1.4 |

Returning to the operation of the adsorption tower B, the charcoal flowing thru zone 37 is substantially entirely freed of CO. It then passes into zone 38 where, at temperatures of about 190 to 400° F., substantially all $CO_2$ is eliminated along with steam. The $CO_2$ is withdrawn by line 39 and discharged from the system. The denuded charcoal, which is essentially in equilibrium with pure steam at the temperature and total pressure of the bottom of the column, passes from the bottom of the tower by line 40 and is thence elevated by line 41 to a point above the top of the tower for recycling therein. Mechanical elevators may be used for this purpose, however the drawing shows the use of a gas lift instead. Hot gas is circulated from the top of separator 43 via line 42 and blower 48 to pick up charcoal from standpipe 40, fluidizing it and conducting it to the cyclone separator 43 from which the charcoal is returned to the adsorption tower by line 45. The hot charcoal flowing from the top of the column down thru the heated section 51 is stripped of adsorbed steam by the countercurrently rising stream of hydrogen, so that when the charcoal has subsequently passed thru the cooling section 52 it will have full adsorption capacity for CO. The heat required for stripping the steam from the charcoal in 51 is supplied by heating coil 50, which can be controlled to hold the temperature of the charcoal at about 400° to 700° F. and supply the latent heat needed to desorb water from the adsorbent. The charcoal should be provided in the form of pellets or granules of sufficient dimensions to permit free flowing of gases therethru. Granules ranging in size all the way from one-fourth inch in diameter to 50 to 100 mesh can be employed and 10 to 30 mesh is a satisfactory size range.

If the adsorption tower is operated in such a manner as to allow some residual $CO_2$ to remain on the charcoal, some contamination of hydrogen with $CO_2$ withdrawn by line 20 will result. If operated in this manner it will usually be necessary to provide a scrubbing tower for removal of the small amount of contaminating $CO_2$, e. g. 1 to 5 volume percent, entering the hydrogen in this way. The removal of small amounts of contaminating $CO_2$ by alkali washing, etc., is not a serious problem when compared with the problem of removing large volumes of $CO_2$ in the usual CO conversion process.

Where the feed gas supplied by line 19 to the adsorption tower contains nitrogen, the hydrogen product will be contaminated with nitrogen, no means being provided in our process for selectively absorbing nitrogen from hydrogen. Accordingly, where pure hydrogen substantially free of nitrogen is desired, it is important to employ feed gas which is nitrogen free. Where the fuel supplied to the water gas generator A is natural gas, considerable nitrogen contamination is usually present. If propane is used as the fuel, it is relatively easy to obtain a nitrogen free water gas providing the oxygen supplied by line 10 is relatively nitrogen free.

In general, the water gas from generator A will contain one or two percent unconverted methane. This hydrocarbon is readily adsorbed on the charcoal is adsorption tower B and does not contaminate the hydrogen product. However, in the desorbing zone 37 it is eliminated with the CO and passes by line 24 to the shift converter and thence back to the adsorption tower by line 30 where it is readsorbed. Accordingly, even though only a small amount may be present in the water gas, methane tends to build up in the system requiring an occasional purge, for example thru vent 46. Alternatively, a portion of the gas from the tower where the hydrocarbon concentration is greatest can be continuously or intermittently recycled by line 47 to the water gas generator, where it is introduced with the fuel by line 11.

Our process provides great flexibility in the manufacture of commercial hydrogen. The efficiency of the shift reaction is greatly increased by employing only slightly more than the theoretical amount of steam required for CO conversion. Thus, by employing only 1.0 mol of steam per mol of CO, approximately 75 percent of the CO is converted to $CO_2$. We prefer to operate the converter C with a mol ratio of steam to CO within the range of about 1:1 to 2:1. The resulting gas mixture usually contains a lower proportion of hydrogen than that in the feed gas supplied by line 19. Accordingly, it is usually desirable to introduce the products from the shift converter at a lower point in the adsorption tower B, where the hydrogen concentration in the tower is substantially the same as the hydrogen concentration in the gas from the shift converter. Various modifications of our process will be apparent to those skilled in the art.

Having thus described our process, we claim:

1. The method of producing CO-free $H_2$ from a gas mixture containing substantial amounts of $H_2$, CO, $CO_2$ and $H_2O$, which method comprises introducing said mixture at an intermediate level of an adsorption zone into a downwardly flowing column of a granular solid adsorbent capable of adsorbing CO, $CO_2$ and $H_2O$, passing said introduced gases upwardly counter-current to the downwardly flowing adsorbent under conditions for adsorbing substantially all CO and $CO_2$ from the $H_2$ in a countercurrent portion of the adsorption zone, removing unadsorbed $H_2$ from the upper part of said adsorption zone, selectively desorbing CO from the downwardly flowing adsorbent at a level substantially below the level at which the gas mixture is introduced, adding to the desorbed CO an amount of $H_2O$ which is at least 1 mol of $H_2O$ per mol of CO, but not substantially more than about 2 mols of $H_2O$ per mol of CO, contacting said CO—$H_2O$ mixture at a conversion temperature not higher than about 850° F. with a shift catalyst to convert most, but not all, of the CO—$H_2O$ to $CO_2$—$H_2$, cooling the effluent from the contacting step and returning the cooled effluent to a level in the adsorption zone which is above the CO-desorption level and below the countercurrent portion of the adsorption zone whereby $H_2$ produced in the contacting step passes upwardly in the adsorption zone and is removed with the initially introduced hydrogen component and unreacted CO from the contacting step passes downwardly for desorption and further contacting with $H_2O$ in the presence of the shift catalyst so that CO is thus recycled to extinction, passing adsorbent containing initially introduced $CO_2$ and $CO_2$ from the contacting step downwardly to a $CO_2$ desorption zone and removing $CO_2$ from the adsorbent in said $CO_2$ desorption zone, heating the catalyst to remove substantially all adsorbed components therefrom whereby the adsorbent is denuded and returning said denuded adsorbent to the upper part of said adsorption zone for repeating its cycle.

2. The method of claim 1 which includes the step of conveying solids from the bottom of the adsorption zone to the top of the adsorption zone by the gas lift action of compressed hydrogen withdrawn from the top of the adsorption zone.

3. The method of claim 1 wherein the adsorbent is charcoal.

4. The method of claim 1 wherein the shift catalyst consists essentially of $Fe_2O_3$ and $Cr_2O_3$ with the former present in predominating amounts.

5. The method of claim 1 which includes the step of introducing steam in the $CO_2$ desorption zone for insuring the removal of all $CO_2$ from the adsorbent, introducing adsorbent containing adsorbed steam at the top of the adsorption zone, heating said adsorbent at the top of said zone to a temperature in the range of 400° to 700° F., stripping the hot adsorbent with unadsorbed hydrogen for eliminating adsorbed steam from the adsorbent and cooling the adsorbent as said adsorbent enters the top of the countercurrent portion of the adsorption zone.

6. The method of claim 5 which includes the step of cooling the effluent hydrogen stream from the top of the adsorption zone to effect condensation of steam and separating condensate from uncondensed hydrogen.

LEONARD W. RUSSUM.
JOSEPH F. COFFEY.

REFERENCES CITED

The following references are of record in the file of this patent:

UNITED STATES PATENTS

| Number | Name | Date |
|---|---|---|
| 1,422,007 | Soddy | July 4, 1922 |
| 1,595,683 | Burrell et al. | Aug. 10, 1926 |
| 1,742,247 | Godel | Jan. 7, 1930 |
| 1,825,707 | Wagner | Oct. 6, 1931 |
| 2,070,099 | Twomey | Feb. 9, 1937 |
| 2,254,799 | Erdmann | Sept. 2, 1941 |
| 2,495,842 | Gilliland | Jan. 31, 1950 |
| 2,519,342 | Berg | Aug. 22, 1950 |

OTHER REFERENCES

"Handbook of Physics and Chemistry," 28th ed. (pages 364–365, 388–391), by C. D. Hodgman, published by Chem. Rubber Pub. Co., Cleveland, Ohio.

"Text-Book of Physical Chemistry," by Glasstone, pages 1173, 1175 (sixth ed.), D. Van Nostrand Co., Inc., N. Y., publishers.